US006558763B1

(12) United States Patent
Meixner

(10) Patent No.: US 6,558,763 B1
(45) Date of Patent: May 6, 2003

(54) PACKAGING RECEPTACLE CONSISTING OF A MONOPLANE MATERIAL, AND RECYCLING PROCESS FOR THE RECEPTACLE

(75) Inventor: Hans-Werner Meixner, Wettenberg (DE)

(73) Assignee: Tettra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 07/960,421

(22) PCT Filed: Jun. 18, 1991

(86) PCT No.: PCT/EP91/01125

§ 371 (c)(1),
(2), (4) Date: Dec. 23, 1992

(87) PCT Pub. No.: WO92/00190

PCT Pub. Date: Jan. 9, 1992

(30) Foreign Application Priority Data

Jun. 27, 1990 (DE) .......................................... 40 20 356

(51) Int. Cl.⁷ ................................................. B65D 8/04
(52) U.S. Cl. ....................... 428/35.8; 428/35.9; 428/43; 428/45; 428/46; 428/57; 428/461; 428/576; 220/612; 206/524.2
(58) Field of Search ............................... 428/35.8, 576, 428/35.9, 43, 46, 45, 57, 461; 220/416, 419, 476, 612; 206/484, 524.2, 524.9

(56) References Cited

U.S. PATENT DOCUMENTS 3,055,152 A    9/1962  Williams .......................... 53/29
3,240,611 A    3/1966  Williams ........................ 99/181
4,662,521 A    5/1987  Moretti ...................... 206/484.2
4,734,303 A    3/1988  Fujiware et al. ............... 428/35

FOREIGN PATENT DOCUMENTS

| CA | 1036982 | 8/1978 |
|---|---|---|
| CA | 1137406 | 12/1982 |
| DE | 1710113 | 9/1955 |
| DE | 1527572 | 7/1970 |
| DE | 1761403 | 7/1971 |
| DE | 28 30 717 | 1/1980 |
| DE | 8321363 | 11/1983 |
| EP | 0 066 441 | 7/1982 |
| EP | 0 196 721 | 10/1986 |
| EP | 0 276 893 | 8/1988 |
| EP | 0 360 171 | 3/1990 |

OTHER PUBLICATIONS

Relnsch, Hans H.: "Verpacken in Superdünner Stahlfolie".
Wellinger, K. and Krageloh, E., "Werkstoffe and Werkstoff-prufung," vol. 3, pp. 73, 287.
DIN Standard 1616.

*Primary Examiner*—Rena L. Dye
(74) *Attorney, Agent, or Firm*—Foley & Lardner

(57) ABSTRACT

Disclosed is a container, made by folding, with fold-in flaps, for packaging food. The container can be recycled economically, i.e. with a profit. The material consists of a metal sheet coated with a plastics skin which, when the metal is recovered, produces no residual matter or pollutants. The edges of the containers are welded to each other by the plastics coating. After bending open the flaps, the container can be easily laid flat by hand (thus reducing its volume) without it springing back and used containers can be collected in compact form in a recycling container and transported in the recycling container to the recycling facility where the metal is recovered by melting.

30 Claims, 1 Drawing Sheet

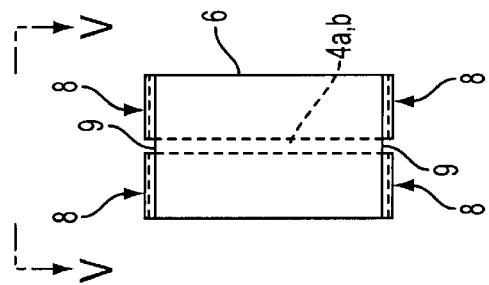
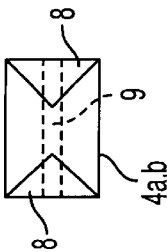
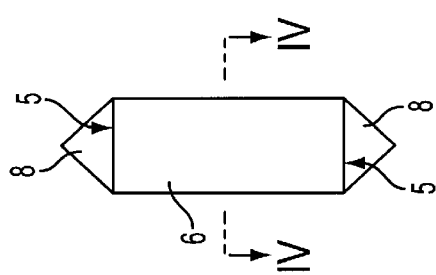
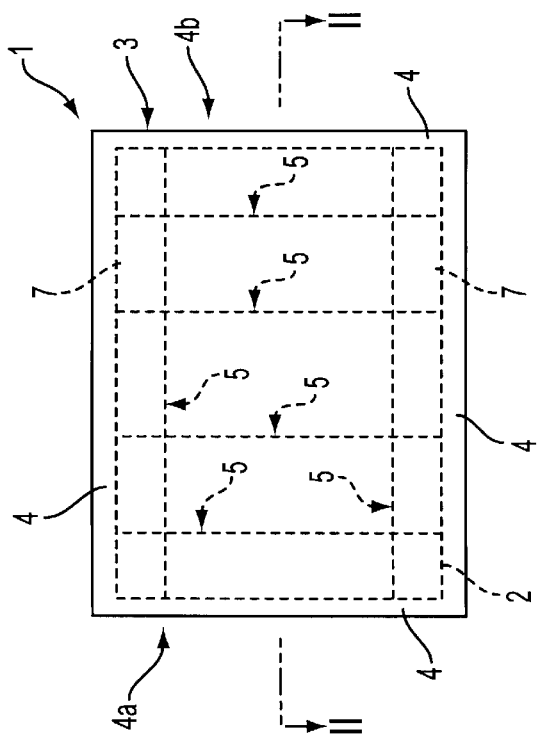
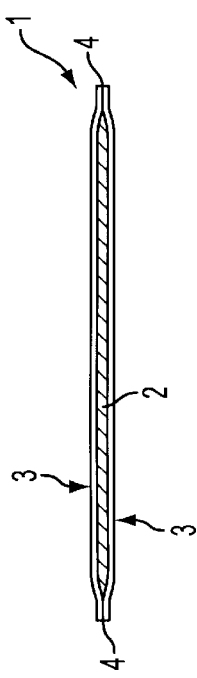

PACKAGING RECEPTACLE CONSISTING OF A MONOPLANE MATERIAL, AND RECYCLING PROCESS FOR THE RECEPTACLE

DESCRIPTION

The invention relates to a receptacle consisting of a monoplane material and to a recycling process for the receptacle. "Recycling" is taken to mean the recovery of raw materials.

Such receptacles are customarily made of paper which has been suitably treated in order not to allow liquid or semi-liquid foodstuffs to seep through the packaging material or to have a detrimental effect on it. The margins of the original sheet of paper are glued together after the shaping process and folded in for reinforcing purposes so that, for instance, a quadrate receptacle is formed, as is familiar from milk packs. The paper material is difficult to recover in the case of these receptacles because it is interspersed with ancillary materials such as aluminium due to the special treatment of the paper. Such receptacles affect the environment because they cannot be destroyed except by incineration, whereby pollutants may be released, however. Other receptacles are made of a tinned metal sheet which is welded, for example, with its margins, as is known from tins, so that the contents are closed off under air-tight conditions. The tinning serves to prevent the sheet from rusting and/or as a lubricant in the deep drawing and/or ironing process. It is difficult to detach when recovering raw materials, so that recovery of the raw materials is uneconomic. Moreover, the use represents a waste of raw material because tin is an increasingly scarce commodity worldwide. Above all, however, the bulky geometric form of the known tins is difficult to destroy mechanically (not manually). This is due to tins not being folded from one piece of material but being produced by other methods. Other receptacles in the form of bottles or the like are in fact suitable for a recycling process. They involve, however, cost-intensive return transport and special cleaning measures, which for their part pollute the environment. Moreover, bottles are highly susceptible to mechanical damage, so that the reject rate is relatively high. Another recovery method is to transport the empty bottles back to a glassworks in order to melt down the glass. The return transport is cost-intensive because bottles are a bulky commodity.

It is the object of the invention to provide an intrinsically stable packaging receptacle, in particular for foodstuffs, which consists primarily of a reusable metal, from which the raw material can be recovered with minimum pollution and with economic efficiency after its designated use following a reduction in volume which can be carried out effortlessly and easily by hand as well as a recycling process for such a receptacle.

This object is solved by the characterizing feature of claim 1.

The metal sheet has a thickness in $\mu$-range, depending on purpose. The applied plastic skin prevents the sheet from rusting. It furthermore serves to weld the seams of the receptacle. The starting material can be folded into receptacles in the same way as paper receptacles.

In contrast to conventional tins made of metal sheet, the receptacle according to the invention has the advantage that, when it is empty, it can be easily compressed flat manually, if just the flaps of the receptacle are folded upwards, whereby it retains its compressed flat form with no special measures, i.e. does not tend to spring apart again. In this form it can be collected in a container, namely collected in compact form, so that it is worthwhile transporting the container to the reprocessing location. To prevent extraneous material from being deposited in the container, the latter can be provided with a flat slot capable of receiving only the used compressed material. In contrast to paper receptacles with an aluminium and/or plastic additive, the receptacle according to the invention is easy to recycle. In order to implement the recycling process, the compressed receptacles are heated until the metal melts and the plastic burns under heat discharge. The plastic is burned without any environmentally incompatible pollutants being released, apart from $CO_2$. The energy being released in the form of heat can be used subsequently and replaces the primary energy which is necessary in any steel works, as a result of which the proportion of $CO_2$ being released is ultimately not increased.

If such a receptacle is thrown inadvertently into the normal domestic refuse, the packaging material can be recovered at the refuse collection point, namely by means of a magnet, if or because the metal as such is ferromagnetic.

The metal sheet as such is completely enclosed by the applied plastic skin. The metal sheet cannot rust, at least not until the plastic detaches itself from the metal. This is the case only after a considerable time. The metal sheet cannot have a detrimental effect on the foodstuffs either in taste or in durability, because the plastic skin forms an insulating layer. Moreover, light penetration is prevented if the receptacle wall is given sufficient thickness by its layered materials. The metal can moreover be printed prior to shaping, for example in the manner of newspaper printing. The print is then under the plastic skin, which in this case is transparent. The printing is therefore resistant to scratching and wiping. Instead of the metal sheet, the plastic skin can also be printed.

In order to be able to empty out the contents, one of the flaps can, as actually known, be folded upwards to be cut off, as a result of which the receptacle contents are accessible. In a further development of the invention, a perforation is provided along which at least one of the flaps can be torn off. However, an opening which can be pierced by a straw, for instance, can also be provided, as actually known, which is formed according to the invention by material thinning, for instance of the metal sheet. The provided piercing point is located advantageously protected under a flap which is bent back for emptying purposes. An opening which is closed with detachable adhesive tape can, however, be provided from the outset in the receptacle wall.

Further details of the invention can be gathered from the sub-claims.

BRIEF DESCRIPTION OF THE DRAWINGS

An embodiment of the invention is shown on the drawing, wherein

FIG. 1 shows the top view of a length of packaging material;

FIG. 2 shows a section along the line II—II of FIG. 1;

FIG. 3 shows the side view of a semi-shaped receptacle;

FIG. 4 shows a view of the receptacle shown in FIG. 3 towards the arrow IV in finished form;

FIG. 5 shows the top view of the receptacle shown in FIG. 4 towards the arrow V;

FIG. 6 shows a receptacle in compressed state after being emptied.

According to FIG. 1, the packaging material (1) is rectangular in form and is laid out in one length. It consists according to FIGS. 1 and 2 of a pure metal sheet (2) to which a plastic coating (3) is applied on all sides. The plastic coating (3) projects with a margin (4) over the margins of the metal sheet (2). The metal is thus protected from rusting.

To shape the receptacle, the packaging material is folded along the lines (5), so that a receptacle (6) as shown in FIG. 3 is produced in an initial stage. The top and bottom strip (7) of the packaging material forms in part the top and bottom closure of the receptacle (6), and the surplus material is shaped into flaps (8).

According to FIG. 4, the flaps (8) are folded in. They can be welded to the actual receptacle (6) by means of the plastic skin. The flaps stay close to the receptacle without any special attachment, however, even after being folded upwards, on account of the characteristic of the material.

The overlapping inside and outside surfaces of the edges (4a and 4b) are also welded to one another. The top and bottom margin (9) of the packaging material also overlap after the folding operation and are welded by means of the plastic skin.

The receptacle formed in this way is extremely stable due to its production by folding, whereby a stable geometric triangle is formed. The stability is moreover increased by the welded margins (9) and by the flaps (8) being bent in and positioned against the receptacle and possibly welded to it. The stability is moreover supported by the foodstuff once it has been filled in. When the receptacle is empty it can, as shown in FIG. 6, be compressed without difficulty into shape (10). The welded flaps are detached if necessary from the receptacle for this purpose and then folded back. This destroys the stable geometric triangle contained in the packaging body. On account of the bending characteristics of the metal sheet (2), the receptacle retains its compressed form without springing back.

The former flaps are marked again with (8) for this purpose.

In the compressed form the receptacle can be pushed through the slot of a container or the like, so that it is stored in a compact filling quantity which can be used for the recycling process to the effect that the metal sheet melts on being heated and can be recovered without any special further measures as it is pure, i.e. it has no inclusions. The plastic is burned at this temperature without any residue. The combustion heat can be collected and used. All that escapes in this recycling process is $CO_2$ through the burning of the plastic.

Reference numbers
1 Packaging material
2 Metal sheet
3 Plastic coating
4 Margin of plastic skin
4a Edge
4b Edge
5 Folding lines
6 Receptacle
7 Strips
8 Flaps
9 Margins
10 Compressed form

What is claimed is:

1. A self-supporting recyclable packaging receptacle, comprising:
    a bendable initially flat metal sheet having margins around the periphery thereof, said metal sheet further having a top and bottom major surface;
    a plastic coating material applied to at least one of said top and bottom major surfaces of said metal sheet, said plastic coating releases no environmentally incompatible pollutants apart from $CO_2$;
    folds and creases in said metal sheet formed by bending and creasing said metal sheet, said folds and creases bringing at least two of said margins of said metal sheet together in an adequate contacting relationship for welding;
    a weld formed by heat-sealing said contacting margins; and
    metal sidewalls and metal end walls formed by said folds and creases which produce the self-supporting shape of said self-supporting packaging receptacle, and wherein said receptacle is recyclable, and said metal is meltable.

2. Receptacle according to claim 1, further comprising flaps which are welded to the receptacle wall.

3. Receptacle according to claim 1, wherein said metal is oxidizable.

4. Receptacle according to claim 1, wherein said plastic coated metal sheet is food-compatible and environmentally compatible and said receptacle is used for storing foodstuff.

5. Receptacle according to claim 1, wherein said plastic has a melting point which is above the temperature of a substance held in said receptacle.

6. Receptacle according to claim 1, wherein the welds of the receptacle are formed in such a way that they are gastight.

7. Receptacle according to claim 1, wherein said receptacle is impermeable to liquid.

8. Receptacle according to claim 1, wherein said metal is a pure metal alloy.

9. Receptacle according to claim 1, wherein said metal consists of iron, chromium steel, nickel and chromium steel.

10. Receptacle according to claim 1, wherein said metal is ferromagnetic.

11. Receptacle according to claim 1, wherein said plastic is a polyolefin.

12. Receptacle according to claim 1, wherein said plastic is ethylene acrylic acid (Primacor).

13. Receptacle according to claim 1, wherein said plastic coating is firmly attached to the metal sheet without a bonding agent.

14. Receptacle according to claim 1, wherein said plastic coating covers the metal sheet in the basic shape for forming the receptacle on both sides, including the margins.

15. Receptacle according to claim 1, wherein said plastic coating projects in the form of flaps at the margins of the metal sheets.

16. Receptacle according to claim 1, wherein said metal sheet located in the plastic coating is printed and that the plastic coating is transparent.

17. Receptacle according to claim 1, wherein said plastic coating is transparent and printed.

18. Receptacle according to claim 17, wherein said plastic coating is transparent and printed from the inside.

19. Receptacle according to claim 2, wherein one of said flaps has a perforation.

20. Receptacle according to claim 2, further comprising a pierceable region provided by material thinning in the wall of the receptacle for the purposes of emptying the receptacle, wherein the thinned region is under said flap of the receptacle.

21. Receptacle according to claim 1, further comprising an opening which is provided in one of said receptacle walls, said opening being closeable with a detachable strip of material.

22. Receptacle according to claim 2, wherein said receptacle compressed flat after emptying after tearing off and/or folding back the flaps, that the receptacle in the compressed form is thrown into a slot of a collecting receptacle (container), that the container is transported to a metal-recovery plant, and that the container contents are heated there to above the melting point of the metal in such a way that the plastic burns completely under heat emission with $CO_2$ being released, and that the metal is collected and reused.

23. Receptacle according to claim 1, wherein an overlapping contacting relationship of said at least two margins is formed by contacting the inside of one of said margins with the outside of the other of said margins.

24. Receptacle according to claim 1, wherein an overlapping contacting relationship of said at least two margins is formed by contacting the outside of one of said margins with the outside of the other of said margins.

25. Receptacle according to claim 1, wherein said overlapping contacting relationship of said at least two margins is formed by contacting the inside of one of said margins with the inside of the other of said margins.

26. Receptacle according to claim 1, wherein said self-supporting receptacle can be manually compressed flat.

27. Receptacle according to claim 1, wherein said plastic coating is applied to both of said top and bottom major surface.

28. Receptacle according to claim 27, wherein said sidewalls and end walls comprise two end walls and four sidewalls.

29. Receptacle according to claim 1, wherein said sidewalls and end walls comprise two end walls and four sidewalls.

30. Receptacle according to claim 1, wherein said weld is produced by a high frequency energy.

* * * * *